Jan. 13, 1959  F. LEISTER  2,868,594
PILLOW BLOCK
Filed Nov. 16, 1955

INVENTOR
Fayette Leister
BY
Mitchell Bechet
ATTORNEYS

United States Patent Office 2,868,594
Patented Jan. 13, 1959

2,868,594

PILLOW BLOCK

Fayette Leister, New Britain, Conn., assignor to The Fafnir Bearing Company, New Britain, Conn., a corporation of Connecticut Application November 16, 1955, Serial No. 547,092

2 Claims. (Cl. 308—15)

My invention relates to a bearing mounting, which may be in the form of a flange mounting, pillow block, or the like.

It is an object of the invention to provide a very simple bearing mounting, which is cheap to manufacture and yet which will be a suitable bearing mounting for all ordinary loads.

It is another object to provide a bearing mounting, which is very simple to assemble, and which will hold the bearing in its support or housing with sufficient security during shipment and handling.

Another object is to provide a bearing mounting, which will be relatively quiet in operation.

A further object is to provide an improved bearing mounting which will permit self-alignment.

Other objects and various features of novelty and invention will be hereinafter pointed out or will become apparent to those skilled in the art.

In the drawings which show, for illustrative purposes only, preferred forms of the invention:

The bearing mounting may be in the form of a flange mounting or the like, or a pillow block, and in the form shown the invention has been illustrated as embodied in a pillow block. The bearing mounting or housing, in general, may constitute spaced apart plates or the like, having opposed facing edges, and the bearing to fit into the housing or mounting fits between those side edges. The bearing may be provided with slot means or depressions to receive the side edges and thus hold the bearing in place.

In the form shown in Figs. 1 to 4, the bearing mounting comprises a plate 5, having spaced apart opposed legs 6—7, having facing edges, as will clearly appear. The plate is recessed in general U-form, and the edges of the legs 6—7 are the inside edges of the recess formed by the U-shaped opening. The bearing may comprise an outer ring 8, an inner ring 9, with interposed antifriction bearing members 10. When the bearing fits directly in the housing, the outer ring may be provided with retaining means for riding over the opposed edges of the legs 6—7 and, in the form shown, such retaining means may constitute milled slots 11—12 in opposite sides of the outer ring. Thus, when it is desired to assemble the bearing with the mounting, the bearing is simply dropped down into the U-shaped recess with the milled-out slots 11—12 embracing the opposed edges of the legs 6—7. The fit of the slots 11—12 on the legs 6—7 is preferably fairly loose so as to permit slight self-alignment of the bearing in its housing. The slots also prevent rotation of the outer ring in the housing. The U-shaped opening in the plate 5 preferably has the curvature at the bottom of the U, as indicated at 13, the same as the curvature of the outer ring, so that the latter rests or is cradled in the U-shaped slot in the plate. Thus, the ring is supported or cradled for almost 180° of its circumference, and yet since the bearing simply rests in the cradle, it may self-align itself, as heretofore described.

Figure 1:
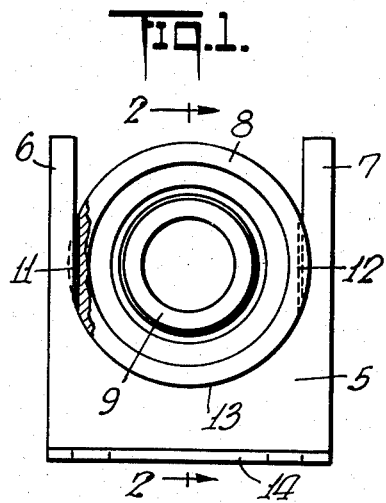
Fig. 1 is an axial view in elevation of a bearing mounting illustrating features of the invention.
Figure 2:
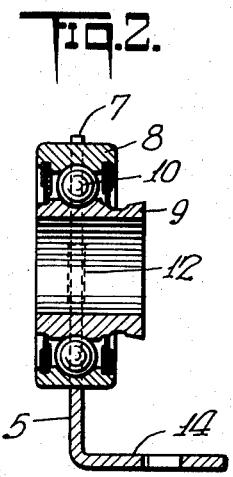
Fig. 2 is a central, vertical, sectional view, taken substantially in the plane of the line 2—2 of Fig. 1.
Figure 3:
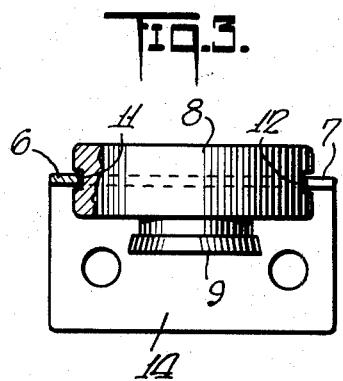
Fig. 3 is a top plan view of the bearing mounting shown in Figs. 1 and 2.
Figure 4:
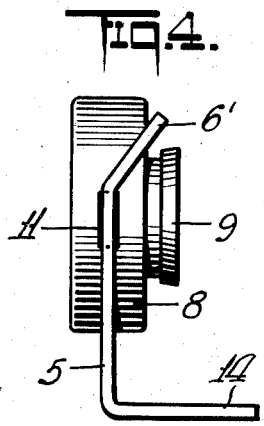
Fig. 4 is an edge view in elevation of a mounting and showing one method of holding the bearing in its mounting.

The bearing may be held in its housing in various ways, but I prefer to bend the top of one or both of the legs 6—7, as indicated at 6' in Fig. 4. This bending of the leg 6 or both legs, if desired, will prevent the bearing from falling out of its cradle housing, and therefore the bearing and housing may be handled as a unit and both may be subjected to fairly rough handling during shipment and assembly. When the mounting is embodied in a pillow block, the plate 5 may have its bottom end turned at right angles, as indicated at 14, so as to provide a foot to rest upon a support. Means such as bolts or screws may pass through holes in the foot and hold the pillow block in the desired position.

Figure 5:
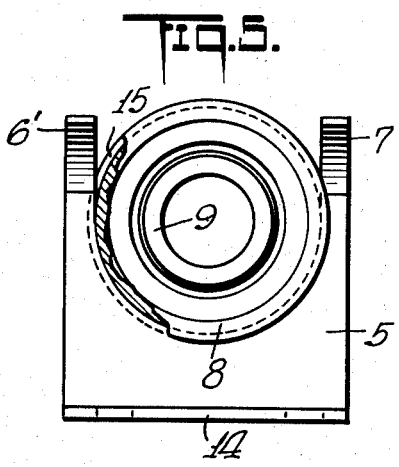
Fig. 5 is a view in axial elevation showing a modified construction.
Figure 6:
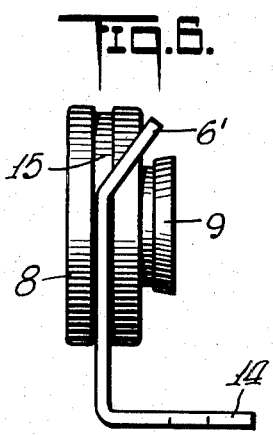
Fig. 6 is a side edge view of the construction shown in Fig. 5.

In the form shown in Figs. 5 and 6, all parts may be exactly the same as those heretofore described and have been given the same reference characters, except that, instead of milling individual slots in opposite sides of the outer ring, the latter is provided with a circumferential groove 15 therein so that the bearing may be dropped down into its cradle in any position of rotation of the outer ring, whereas, in the form shown in Figs. 1 to 4, the milled slots 11—12 must first be lined up with the legs 6—7 before the bearing may be dropped into place. It will be understood that the continuous circumferential groove 15 may be turned in the ring during the turning operations necessary in forming the ring, whereas individual slots such as 11—12, shown in Figs. 1 to 4, require separate operations independent of any turning operations. Thus, the form shown in Fig. 5 makes for simplicity of manufacture, in that the groove may be turned during other turning operations. Instead of mounting the bearing directly in its U-shaped cradle, I may hold the bearing in a separate bushing or housing, which, in fact, may be a part of the bearing itself.

Figure 7:
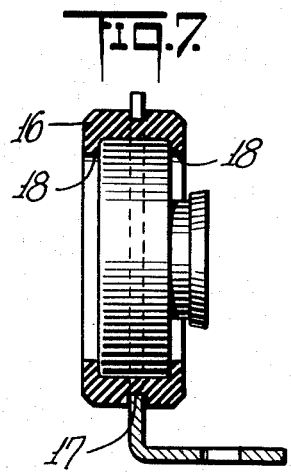
Fig. 7 is a view in edge elevation of a bearing and mounting illustrating a further modification.

In the form shown in Fig. 7, I employ a bushing 16 having opposed slots or a continuous groove 17 in the outer surface so as to embrace the edges of the legs 6—7, and the bushing preferably has radial inturned lips 18 to embrace opposite sides of the outer bearing ring for holding the same in place. Thus, with the bushing 16 mounted on the outer ring and held in place thereon by the lips or beads 18, the assembly may be dropped down into the U-shaped cradle of the bearing housing and held in place as heretofore described. The depression 17 may be in the form of two opposite slots, similar to those shown in Fig. 1, or may be in the form of a continuous groove, as illustrated particularly in Fig. 6. In any event, the assembly will be held together, and when the bushing is formed of proper resilient material, such as rubber, the bearing will be rendered more or less noiseless, since the rubber absorbs vibration of the bearing. Furthermore, the give or flow of the rubber itself may permit some self-alignment independently of the loose fit between the groove 17 and the opposed edges of the legs 6—7.

Figure 8:
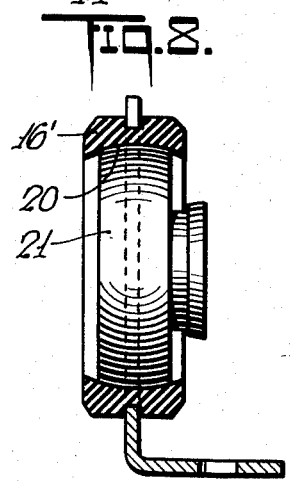
Fig. 8 is a view similar to Fig. 7, illustrating a still further modified form.

In the form shown in Fig. 8, all parts are the same as shown in Fig. 7, except that the rubber bushing 16' is provided with a generally spherical inner surface, as shown at 20, and the outer ring has a generally spherical outer surface 21 to fit within the spherical seat 20 in the bushing. Thus the bearing will be permitted to self-align whether or not there be a loose fit between the groove in the bushing and the legs 6—7.

It will be seen, then, that I have provided an improved bearing mounting, which may be in the form of a pillow block or other type of mounting, and which embodies very few parts and which are readily formed. The bearing will be held in the housing with the desired degree of security during use as well as during shipment and handling. Provision for self-alignment is readily made, and when quiet is required, the bearing may be bushed in its housing, so as to provide vibration-absorbing material to assure quiet operation.

While the invention has been described in considerable detail and preferred forms illustrated, it is to be understood that various changes may be made within the scope of the invention as defined in the appended claims.

I claim:

1. In a pillow block, a base to be secured to a support, said base having an upstanding plate thereon, said upstanding plate having a generally U-shaped slot therein and defining two upright spaced apart legs, said slot in said plate terminating substantially short of said base, an annular bearing part resting in and supported by said slot and having slot means in the outer circumferential surface thereof fitting over the inside edges of said upright spaced apart legs, said legs and slot means serving to hold said annular bearing part against axial movement on said upstanding plate, at least one of said upstanding legs at a point above the point of engagement of said leg with said slot means being bent over transversely of itself and of said slot means and in the general direction of the axis of said annular bearing part to prevent withdrawal of said annular bearing part from said slot in said upstanding plate.

2. In a pillow block, a sheet metal base having apertures therein for securing means to secure said base to a support, said base having an integral upstanding plate at one side thereof, said plate having a transverse generally U-shaped slot therein and defining two upstanding spaced apart legs, said U-shaped slot in said plate terminating substantially short of said base, an annular bearing part resting in and supported by said slot and having slot means in the outer circumferential surface thereof fitting over the inside edges of said upstanding legs, said slot means and said legs serving to hold said annular bearing part against axial movement on said plate, at least one of said upstanding legs being bent over in a direction transversely thereof and of said slot means and in the general direction of the axis of said bearing part so as to prevent said bearing part from slipping out of said slot in said plate in a direction transverse to the axis of said bearing part.

References Cited in the file of this patent

UNITED STATES PATENTS

| Number | Name | Date |
|---|---|---|
| 791,559 | Keene | June 6, 1905 |
| 862,188 | Ohl | Aug. 6, 1907 |
| 2,047,838 | Smith et al. | July 14, 1936 |
| 2,057,370 | Dehlendorf et al. | Oct. 13, 1936 |
| 2,186,686 | Stanley | Jan. 9, 1940 |
| 2,223,872 | McWhorter et al. | Dec. 3, 1940 |
| 2,381,391 | Brown | Aug. 7, 1945 |
| 2,737,424 | Greger | Mar. 6, 1956 |